March 12, 1957 S. JENCICK 2,784,575
FLEXIBLE COUPLINGS
Filed Aug. 23, 1954

INVENTOR.
STEPHEN JENCICK
BY
Milburn & Milburn
ATTORNEYS

United States Patent Office 2,784,575
Patented Mar. 12, 1957

2,784,575

FLEXIBLE COUPLINGS

Stephen Jencick, Chagrin Falls, Ohio

Application August 23, 1954, Serial No. 451,650

2 Claims. (Cl. 64—13)

This invention relates to the general art of flexible couplings.

My present improvement relates more particularly to a coupling of elastic rubber-like material having an exclusively annularly disposed reinforcing cord embedded therein, and it is my object to devise such a coupling that has improved means for compensating for any and all misalignment between the drive and driven members.

Another object consists in devising a simple, efficient method of forming such a coupling with an exclusively annularly arranged reinforcing cord means therewithin.

Another object is to devise a flexible coupling member of elastic rubber-like material with connecting knobs of such form as to provide increased operating efficiency and longer life particularly in the region of the bolt holes therethrough.

Other objects will appear from the following description and claims when considered together with the accompanying drawing.

By way of introduction, my present form of coupling comprises a flat circular ring-like body B of elastic rubber or rubber-like material with equi-spaced apertured knobs of the same or like material and of particular form for connection of the spider arms between the drive and driven shafts. Within this flexible body there is embedded a continuous one-piece reinforcing cord which is arranged in a particular manner for a particular purpose, as will be more fully understood from the following. With this brief description, I will now explain the method of making this improved coupling member.

Figure 1:
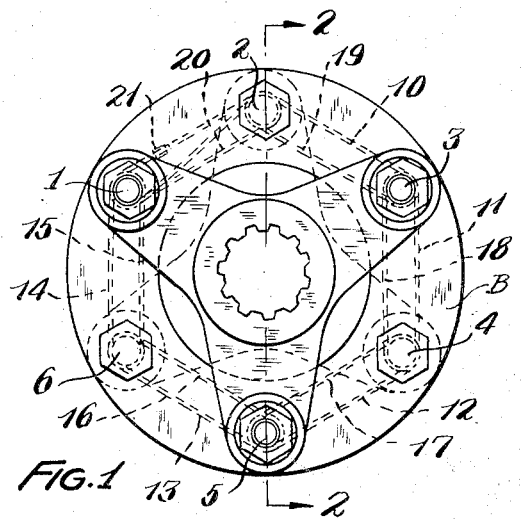
Fig. 1 is an end elevation of an assembly including my present improved flexible coupling.
Figure 2:
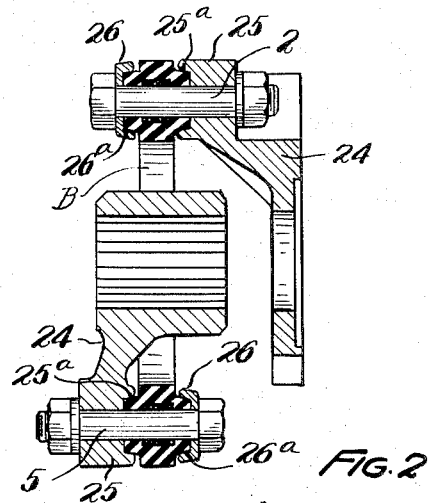
Fig. 2 is a sectional view taken on line 2—2 of Fig. 1.
Figure 3:
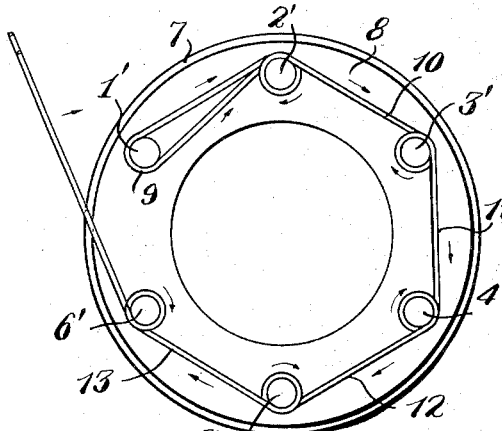
Figs. 3, 4 and 5 illustrate the successive steps in my present improved method of winding a single continuous cord into loop form for engagement about the bolts of the coupling assembly.
Figure 4:
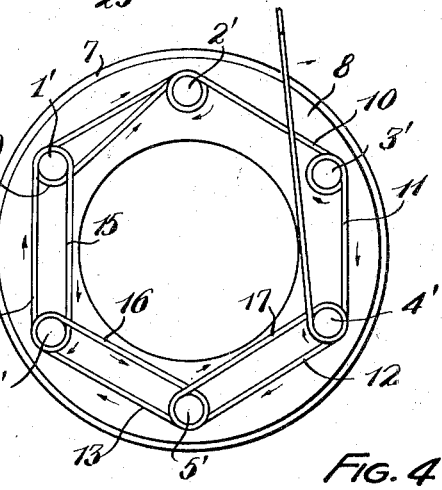
Figure 5:
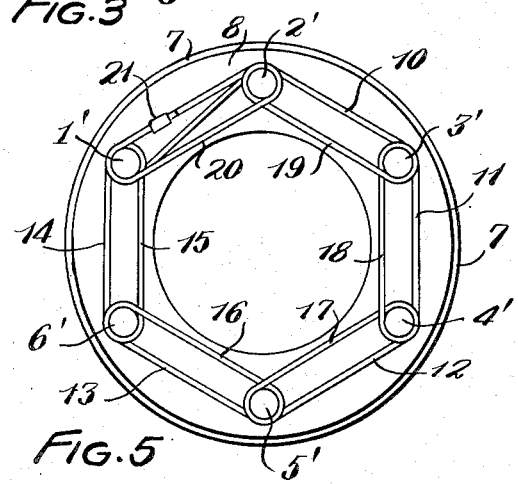
Figure 6:
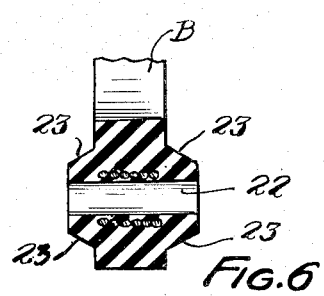
Fig. 6 is an enlarged partial view of a knob portion.

I provide six metal pins 1', 2', 3', 4', 5' and 6' at equi-spaced points upon a metal disk 7 and about its axial center so as to correspond in size and position with the bolts 1, 2, 3, 4, 5 and 6 of the completed coupling assembly. An annular disk 8 or flat ring of rubber, with suitable spaced holes, is placed over the pins 1', 2', 3', 4', 5' and 6' and upon the disk 7, this ring 8 being of the same radial dimension, or substantially so, as that desired for the finished flexible coupling member. Then I double a single rubberized cord upon itself and place its doubled end 9 about pin 1', corresponding to bolt 1, as a means of anchoring the same. (See Fig. 3 of the drawing.) This doubled cord is then extended in taut condition to the outside of and thence completely around the next pin 2' in clockwise direction and in clockwise order, as viewed in the present illustration, and thence the doubled cord is continued along an outside tangential path 10 to and completely about the next pin 3' in clockwise direction. This procedure is continued, with the further tangential portions 11, 12, 13 and 14, until the first pin 1' is reached where the doubled cord is extended to the outside of the first pin 1' and passed only 180 degrees thereabout so as to reverse the direction of the winding of the cord. Thence the doubled cord is continued from the inside of the first pin 1' along the inside tangential path, as at 15, and wound clockwise completely around the last pin 6', thence along the tangential paths 16, 17, 18, 19 and 20 until the doubled cord has been extended about each and every one of the pins and along inner and outer tangential paths therebetween. (See Fig. 4 of the drawings.) Then the free ends of the doubled cord may be secured in any suitable manner to the cord just beyond the first pin 1', as indicated at the point 21. It is to be be understood that this procedure may be repeated to any desired extent so as to provide the most suitable number of stretches of the cord within the rubber body of the flexible coupling.

Then, with the cord in such arrangement, the disk 7 with its pins 1', 2', 3', 4', 5' and 6' will be placed in assembly with a companion cup-shaped container so as to form a mold into which rubber is supplied for vulcanization with the cord properly positioned therewithin. Also the disk 7 will have depressions about the pins 1', 2', 3', 4', 5' and 6' so as to form knobs in the vulcanized rubber body at these points upon the one side of the finished flexible coupling member; and there are corresponding depressions provided in the opposite end of the companion cup-shaped part of the mold so as to form like knobs upon the opposite side of the finished flexible coupling member.

These knobs, which are duplicate form, will have cylindrical inner surfaces 22 and will have their outer surfaces, in each instance, in the form of a frustum of a cone, as indicated at 23. This is for the purpose of providing a substantial thickness of elastic rubber throughout the entire extent of each knob even at the point farthest removed from the disk itself. I find that this provision ensures marked efficiency upon distortion of the disk and knobs because of misalignment and there is realized longer life of usefulness with this particular form of coupling member.

As to my particular manner of positioning the reinforcing cord, there is realized not only a saving in time as compared with other coupling members of this same general character, but there is obtained a greater reinforcing component due to the anchoring and snubbing effect of the continuous cord about the bolts when the coupling member is placed under strain in correcting misalignment. With this arrangement of the continuous cord about the anchoring and snubbing bolts, the stress upon any tangential portion of the cord will be transmitted along the length of the entire cord but will also be snubbed as such stress follows the cord about the bolts, with the result that the resultant strain is greatly reduced for any given portion of the cord; and this improvement is calculated to overcome the weakness of this general type of coupling member heretofore especially in the region of a bolt hole. Again it may be emphasized that in the present case the reinforcing cord is of a single continuous form.

Furthermore, the reinforcing cord extends in substantially only an annular manner and the knobs are integral parts of the rubber body so that there may be obtained maximum resilience throughout and also a most efficient reinforcement by virtue of the fact that the cord extends in only the general direction of that of the rotation of the coupling member itself. The heretofore familiar danger of breaking of the rubber at or near the base of a knob or at the outer end of a knob, is practically eliminateed. Also, the vulcanized rubber between all portions of the cord prevents any friction between the cord portions themselves, thereby precluding any danger of heat and wear from any friction that would otherwise occur.

One end of each spider arm 24 is formed with a flat portion 25 through which its bolt extends and which has an annular marginal inclined flange surface 25a extending about the adjacent end portion of the knob. This flange in each instance will serve to confine the rubber of the knob at its end region and to thereby obtain the greatest possible efficiency in the compression of the same as may be incident to any misalignment that the coupling is called upon to correct. The other end of each of the bolts has a duplicate flanged metal disk 26 with inclined inner surface 26a corresponding to and adapted for engagement with the outer end of the opposite knob in the same manner as just described. Thus I am enabled with this particular form of flexible coupling member to obtain the benefit of a substantially increased thickness of rubber at the points of distorting effect between the bolts and knobs, particularly at the end portions of the knobs, which of course is important in compensating for misalignment; and this advantage will of course be realized more and more in direct ratio to the degree of misalignment between the drive and driven shafts.

It is believed that the practical advantages of my present coupling will be fully understood from the above. Notably, I have provided a coupling member that has the knobs formed as integral parts of the rubber body which in turn embodies a reinforcing cord annularly arranged in such manner as to afford a marked efficiency and long life of usefulness. A still further advantage is obtained with the particular form of knobs at the bolt holes, as explained. Furthermore, I have devised a convenient and comparatively inexpensive method for forming such a coupling member which may be employed in the same general assembly as previous coupling members of this same general type.

What I claim is:

1. In a flexible coupling, an annular body of elastic rubber-like material with apertures therethrough at equidistant intervals thereabout and having embedded therein a continuous cord doubled upon itself throughout its length and extending in an exclusively annular manner and being formed with circular portions about said apertures, and pairs of knobs of elastic rubber-like material directly upon opposite sides of said annular body at points corresponding to said apertures and having openings therethrough in registry with said apertures for direct engagement by the bolts of the spider members of a coupling, the axes of said apertures and openings being parallel to the axis of rotation of the coupling, said body and knobs being in the form of a single integral unit with rubber-like material surrounding and separating the individual turns of said cord, said annularly arranged cord having the bight of its doubled end portion arranged concentrically about one of said apertures and constituting the entire reinforcing means of said body, and said body in and of itself possessing a combined flexibility and rigidity to permit correction of substantial misalignment and to ensure transmission of torque as an effective coupling.

2. The method of forming a flexible coupling disk including the steps of doubling a single cord upon itself, placing the bight of the doubled end thereof about one of a series of polygonally arranged parallel temporary bolts so as to provide an anchoring means for the same, than extending the double cord to and about the adjacent temporary bolts in succession so as to provide a tangential extent of the cord upon one side of the adjacent temporary bolts, continuing the same procedure with respect to all of the temporary bolts, then winding the doubled cord only half-way about the first temporary bolt so as to reverse the direction of winding and continuing the winding of the cord in such opposite direction so as to form the same in tangential extents at the opposite side of the temporary bolts and extending the cord about each of the temporary bolts in reverse order, continuing the reversed procedure throughout the entire extent of the temporary bolts, anchoring the free ends of the doubled cord to one of the tangential extents thereof, and embedding the wound cord alone in a body of elastic rubber-like material.

References Cited in the file of this patent

UNITED STATES PATENTS

| 1,691,116 | Jencick | Nov. 13, 1928 |
| 2,659,218 | Riopelle | Nov. 17, 1953 |

FOREIGN PATENTS

| 321,999 | Great Britain | Nov. 28, 1929 |